United States Patent [19]

Inoue

[11] 4,386,835
[45] Jun. 7, 1983

[54] DEVICE FOR REDUCING COUNTER-LIGHT INCIDENT ON A SINGLE-LENS REFLEX VIEW FINDER

[75] Inventor: Yuzuru Inoue, Machida, Japan

[73] Assignee: Victor Company of Japan, Limited, Yokoham, Japan

[21] Appl. No.: 300,540

[22] Filed: Sep. 9, 1981

[30] Foreign Application Priority Data

Sep. 11, 1980 [JP] Japan .............................. 55-126375

[51] Int. Cl.³ .......................................... G03B 13/02
[52] U.S. Cl. ................................... 354/23 R; 354/219
[58] Field of Search ..................... 354/152, 219, 23 R, 354/59

[56] References Cited

U.S. PATENT DOCUMENTS 3,890,627 6/1975 Uno ............................... 354/152 X

Primary Examiner—Michael L. Gellner

Attorney, Agent, or Firm—Pollock, Vande Sande & Priddy

[57] ABSTRACT

The device according to the present invention comprises a photosensitive element responsive to counter-light which enters into an optical view finder from its eyepiece, a detector responsive to the signal from the photosensitive element for producing a control signal when the intensity of the counter-light exceeds a predetermined value, and a shutter arranged to close in response to the control signal for preventing the counter-light from propagating through the optical system of the view finder to another optical system of a video camera, movie camera or the like. Thus, picture quality of the camera or the like is prevented from deteriorating due to the counter-light entering into the view finder. The shutter may be replaced with an aperture stop or a filter so that the shooter can see an objective image through the view finder, while the amount of counter-light transmitted to the optical system of the camera or the like can be reduced.

9 Claims, 3 Drawing Figures

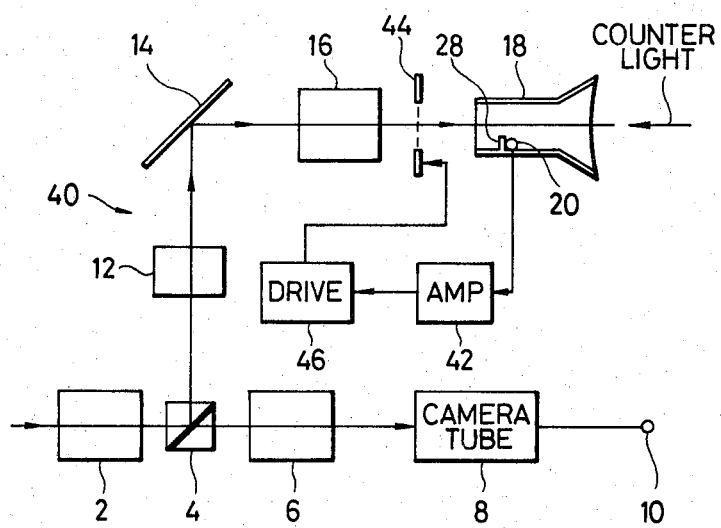

DEVICE FOR REDUCING COUNTER-LIGHT INCIDENT ON A SINGLE-LENS REFLEX VIEW FINDER

BACKGROUND OF THE INVENTION

This invention generally relates to a single-lens reflex optical view finder of an optical system, such as a television or video camera, movie camera or the like, and more particularly, the present invention relates to a device for reducing the amount of counter-light which enters into the view finder through its eyepiece.

In a single-lens reflex view finder used for video cameras, movie cameras or the like, a half-silvered mirror is provided to partially reflecting incident light from a photographic subject so that an image of the photographic subject can be seen through its eyepiece. However, counter-light is apt to enter the view finder from the eyepiece to be transmitted to the half-silvered mirror in a direction opposite to that of the objective light. The counter-light is thus reflected at the half-silvered mirror to be applied to an object glass system in which the counter-light is reflected back to the half-silvered mirror. Some of the counter-light rays applied from the object glass system to the half-silvered mirror propagate therethrough to be applied to a photosensitive surface of the television camera tube in the case of a video camera and to the film in the case of a movie camera. If the intensity of the counter-light is high, the counter-light transmitted to the camera tube or the film may result in the occurrence of flare phenomena, deteriorating picture quality.

In order to remove the disadvantage by counter-light from the eyepiece of the view finder, some conventional video cameras have a shutter in the light path of the view finder so that the shutter may be manually closed to block counter-light. Some other video cameras have a cap which can be manually engaged with the eyepiece to cover the same. However, it is troublesome to manipulate the shutter or to put the cap on the eyepiece each time the shooter removes his eye from the eyepiece. Furthermore, if the shooter peeps into the view finder in such a manner that his or her eye is not in contact with the eyepiece, counter-light has a chance to enter into the eyepiece through the gap between the shooter's face and the eyepiece.

SUMMARY OF THE INVENTION

The present invention has been developed in order to remove the above-mentioned disadvantages and drawbacks inherent to the conventional single-lens reflex view finder.

It is, therefore, an object of the present invention to provide a device for reducing counter-light incident on a single-lens reflex view finder, which automatically reduces or blocks counter-light when the intensity of the counter-light exceeds a given value, so that undesirable phenomena, such as flare, does not occur.

In accordance with the present invention there is provided a device for reducing counter-light incident on an eyepiece of an eyepiece assembly of a single-lens reflex view finder, comprising: (a) first means responsive to counter-light incident on said eyepiece for producing an electrical signal indicative of the intensity of said counter-light; (b) second means responsive to said signal from said first means for producing a control signal; and (c) third means for reducing the amount of said counter-light in said view finder in response to said control signal.

BRIEF DESCRIPTION OF THE DRAWINGS

The object and features of the present invention will become more readily apparent from the following detailed description of the preferred embodiments taken in conjunction with the accompanying drawings in which:

FIG. 3 is a schematic block diagram of a second embodiment of the device according to the present invention.

The same or corresponding elements and circuits are designated at like numerals throughout the drawings.

DETAILED DESCRIPTION OF THE INVENTION

Although the present invention can be applied to both optical movie cameras and to video cameras both having a single-lens reflex view finder to prevent the deterioration of picture quality due to counter-light, the present invention will be described in connection with the case of a video camera.

Prior to describing preferred embodiments of the present invention a conventional single-lens reflex view finder will be discussed for a better understanding of the object and features of the present invention.

Figure 1:
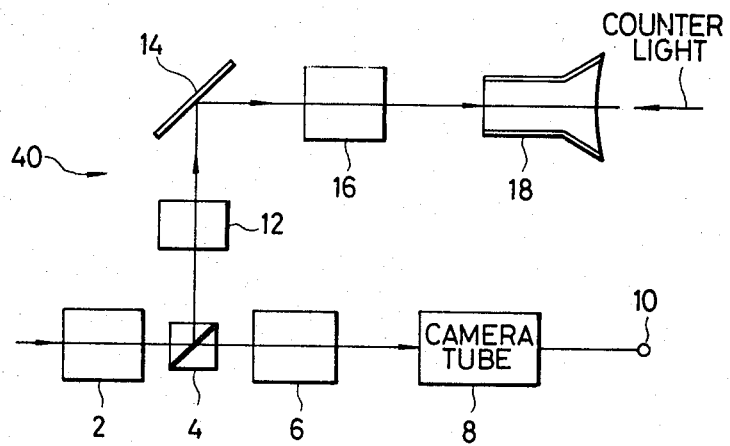
FIG. 1 is a schematic block diagram of a conventional video camera equipped with a single-lens reflex optical view finder.

FIG. 1 is a block diagram showing an example of a conventional video camera having an optical view finder. In FIG. 1, incident light from a photographic subject reaches a half-silvered mirror 4 through an object glass system 2, and most of the incident light rays passing through the half-silvered mirror 4, transmit through a lens system 6 to throw an image on a photosensitive surface of a television camera tube 8. The camera tube 8 converts the optical image of the photographic subject into an electrical signal to deliver the same via an output terminal 10 to an external circuit (not shown). On the other hand, a portion of the incident light from the photographic subject, which light has been branched by the half-silvered mirror 4, is led to a view finder, which is generally designated at a reference 40, to reach an eyepiece assembly 18 via a lens system 12, a total reflection mirror 14, and a lens system 16. A shooter manipulates the camera, observing the photographic subject through the eyepiece assembly 18 of the view finder 40. The eyepiece assembly comprises a cylinder for holding an unshown eyepiece.

When shooting, if the shooter removes his eye from the eyepiece assembly 18, light around the eyepiece is apt to enter the view finder 40 from the eyepiece assembly 18. The light (counter-light) entered from the eyepiece assembly 18 propagates in a direction opposite to the direction of the incident light from the photographic subject to be reflected at the half-silvered mirror 4, and furthermore, it is reflected at a lens surface of the object glass system 2 to reach, via the half-silvered mirror 4, the photosensitive surface of the camera tube 8. Since, the counter-light incident on the camera tube 8 causes the television picture to occur flare phenomena even if its intensity is less than approximately 1/200 to 1/1000 of the incident light from the photographic subject, it is necessary to prevent the deterioration of the picture quality by blocking counter-light having a level over a given value.

Therefore, as described in the above, up to this time a manual eyepiece shutter or cap has been used to block undesirable counter-light. However, such a manual shutter or cap has a disadvantage that it is troublesome to manipulate it each time the shooter removes his or her eye from the eyepiece. Furthermore, since it is easy to forget to close such a manual shutter or to put such a cap, counter-light is apt to enter into the view finder 40. Moreover, even in the case that the shooter peeps into the view finder 40, counter-light has a chance to enter the view finder 40 through the gap between the eyepiece and the face of the shooter unless the shooter's face is in contact with the eyepiece. In the case of shooting by seeing the photographic subject through the eyepiece, it is natural that the shooter does not notice the presence of counter-light even if such counter-light exists. In addition, even if the shooter notices such counter-light, it is almost impossible to judge during shooting whether or not the intensity of the incident counter-light is so high that flare occurs.

Embodiments of the present invention will be described hereinbelow with reference to FIGS. 2 and 3.

Figure 2:
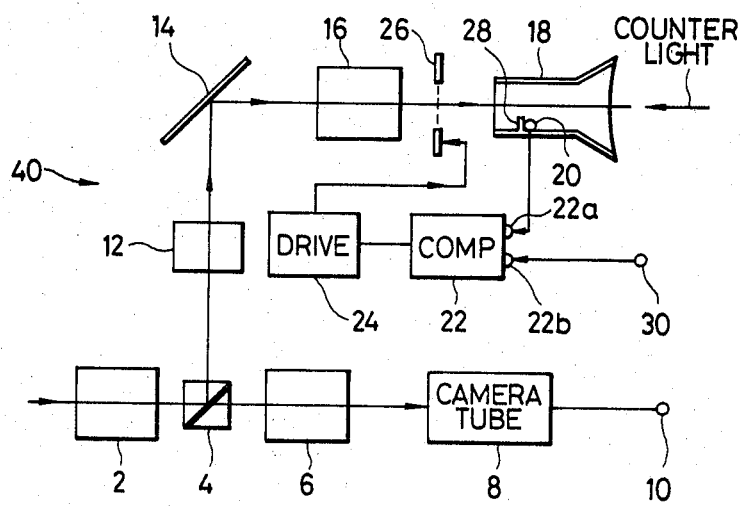
FIG. 2 is a schematic block diagram of a first embodiment of the device according to the present invention.

A first embodiment of the present invention illustrated in FIG. 2 comprises a photosensitive element 20, a comparator 22, a shutter driving circuit 24, a shutter 26 in addition to the conventional example of FIG. 1. In the eyepiece assembly 18, a suitable means, such as a wall 28, for blocking the incident light from the object glass system 2 is provided, and a photosensitive element 20, such as a photodiode, a phototransistor or the like, is mounted close to the wall 28 in such a manner that only the counter-light can be received. In detail, the eyepiece assembly 18 comprises a cylinder for holding the eyepiece (not shown), and the wall 28 projects radially inwardly from the inner surface of the cylinder. The photosensitive element 20 is placed at one side of the wall 28 so as to be responsive to only counter-light. The photosensitive element 20 delivers an electrical signal, whose amplitude varies in accordance with the variation in intensity of the counter-light, to a first input terminal 22a of the comparator 22. The comparator 22 compares the voltage of the signal from the photosensitive element 20 with a reference voltage Vref applied through a terminal 30 to a second input terminal 22b of the comparator 22. The comparator 22 is arranged to produce a control signal, wherein the control signal assumes a high level when the intensity of the counter-light exceeds a predetermined level.

The reference voltage Vref applied to the second input terminal 22b of the comparator 22 will be determined in such a manner that, for instance, the amount of incident light on the object glass system 2 is made zero, and counter-light is introduced into the eyepiece assembly 18. Nextly, the intensity of the counter-light is gradually increased so that an output is detected from the output terminal 10 connected to the output of the television camera tube 8. Here, the output level of the photosensitive element 20 at a point immediately before the output from the terminal 10 is detected is set to the reference voltage Vref. As an alternate method, in the above method, an actual television picture may be observed in place of the detection of the presence of the output at the output terminal 10, and the signal level of the output from the photosensitive element 20 at a point immediately before the occurrence of flare which raises a problem in practical use, may be set as the reference voltage Vref.

When the shutter driving circuit 24 receives the control signal indicating that the output voltage of the photosensitive element 20 has exceeded the reference voltage Vref, the shutter 26, which is placed in the light path of the view finder 40, is closed to block the counter-light. On the other hand, in receipt of the control signal indicating that the output of the photosensitive element 20 is below the reference voltage Vref, the shutter 26 is put in opened state.

In the above, if necessary, a suitable amplifier may be provided between the comparator 22 and the shutter driving circuit 24.

Although in the above-described first embodiment, the shutter 26 is provided to completely block the counter-light, other means for only reducing the amount of counter-light may be used in place of such a shutter. For instance, an optical filter may be arranged in such a manner that the optical filter is put in the light path of the view finder 40 when the intensity of the counter-light exceeds a predetermined level. Furthermore, the shutter 26 may be replaced with an aperture stop which reduces the effective aperture of the view finder 40. In the case that an optical filter or an aperture stop is used in place of the shutter 26 of FIG. 2, the shooter is capable of watching the objective scene through the eyepiece of the view finder 40 all the time, while the amount of counter-light has been reduced to an extent that no undesirable phenomena occur.

When an aperture stop is used, the opening degree thereof may be controlled in accordance with the intensity of the counter-light incident on the eyepiece. Hence, reference is now made to FIG. 3 which shows a second embodiment of the device according to the present invention.

The second embodiment device of FIG. 3 differs from the first embodiment of FIG. 2 in that the comparator 22 is replaced with an amplifier 42, while the shutter 26 is replaced with an aperture stop 44 of adjustable type. The amplifier 42 amplifies the voltage from the photosensitive element 20 to develop a variable voltage whose magnitude is variable in accordance with the intensity of the counter-light. A driving circuit 46 corresponding to the shutter driving circuit 24 of FIG. 2 is responsive to the variable control voltage from the amplifier 42 so that the opening degree of the aperture stop 44 is controlled either continuously or stepwise. With this arrangement the effective aperture of the view finder 40 is diaphragmed by the aperture stop 44 in accordance with the intensity of the counter-light. Accordingly, when the intensity of the counter-light is relatively low, the opening of the aperture stop 44 is relatively large, and thus the shooter can obtain a relatively bright image of the photographic subject.

From the foregoing description it will be understood that the amount of counter-light from the eyepiece is effectively reduced by a shutter, an optical filter or an aperture stop. The position of such a means for reducing the amount of counter-light is not limited to that of the illustrated embodiments. Namely, such a means may be placed at a desired position between the half-silvered mirror 4 and the eyepiece.

Although the above-description is made in connection with the case that the present invention has been applied to a video camera, it is a matter of course that the present invention may be adapted to a single-lens reflex view finder of a movie camera or the like.

As described in the above, the present invention has an advantage that the deterioration of picture quality can be perfectly prevented by automatically reducing the amount of counter-light from the eyepiece when the intensity of the counter-light is so high that undesirable phenomena are apt to occur.

The above-described embodiments are just examples of the present invention, and therefore, it will be apparent for those skilled in the art that many modifications and variations may be made without departing from the spirit of the present invention.

What is claimed is:

1. A device for reducing counter-light incident on an eyepiece of an eyepiece assembly of a single-lens reflex view finder, comprising:
    (a) first means responsive to counter-light incident on said eyepiece for producing an electrical signal indicative of the intensity of said counter-light;
    (b) second means responsive to said signal from said first means for producing a control signal; and
    (c) third means for reducing the amount of said counter-light in said view finder in response to said control signal.

2. A device as claimed in claim 1, wherein said third means comprises a shutter provided in the light path of said view finder so as to close in response to said control signal.

3. A device as claimed in claim 1, wherein said third means comprises an aperture stop provided in the light path of said view finder so as to diaphragm the effective aperture of said view finder in response to said control signal.

4. A device as claimed in claim 1, wherein said third means comprises a filter arranged to put in the light path of said view finder in response to said control signal.

5. A device as claimed in claim 1, wherein said second means comprises a comparator responsive to said signal from said first means and to a reference value.

6. A device as claimed in claim 1, wherein said second means comprises means for producing said control signal which is variable in accordance with the intensity of said counter-light.

7. A device as claimed in claim 6, wherein said third means comprises an aperture stop the opening degree of which is adjustable in accordance with the variable control signal.

8. A device as claimed in claim 1, wherein said first means comprises a photosensitive element provided in said eyepiece assembly, and fourth means for preventing light other than said counter-light from being applied to said first means.

9. A device as claimed in claim 8, wherein said fourth means comprises a wall projecting radially inwardly from the inner surface of the cylinder of said eyepiece assembly.

* * * * *